Figure 1:
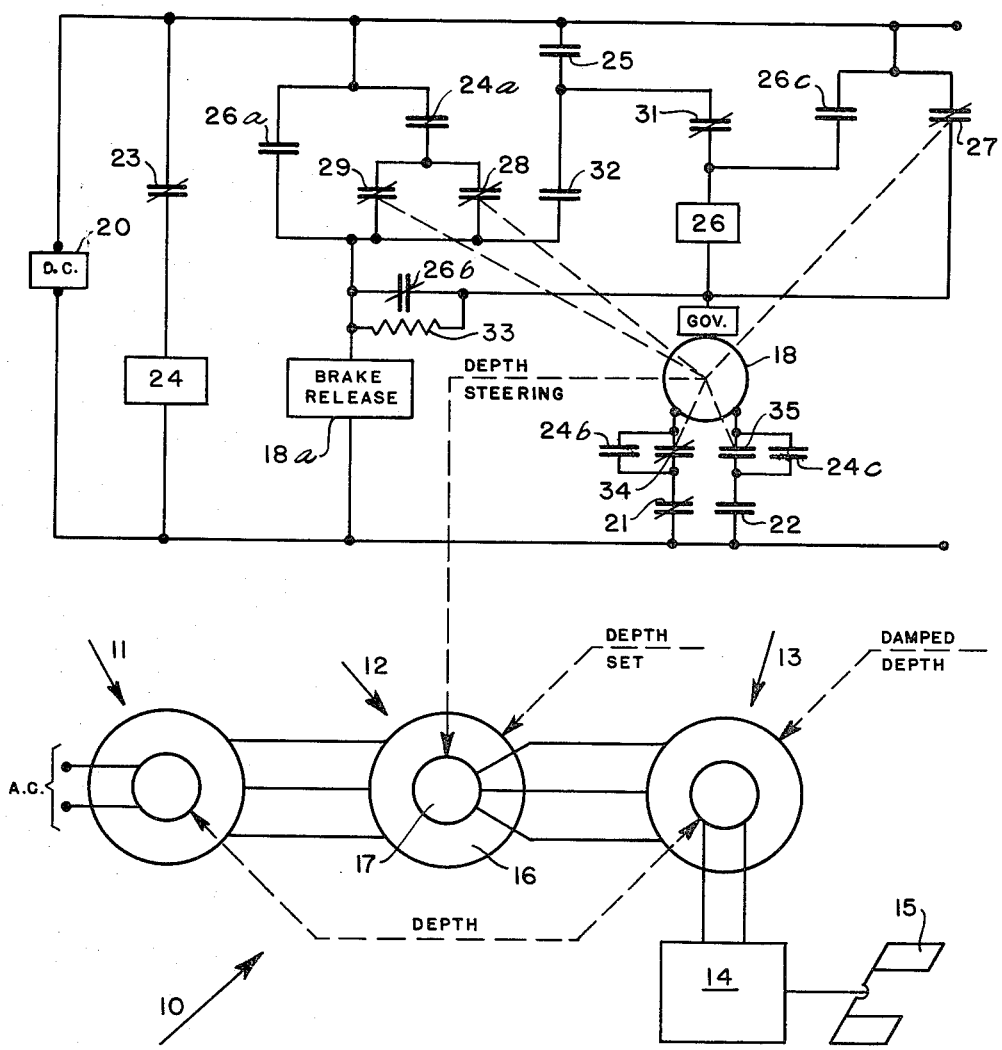

INVENTORS
STEPHEN KOWALYSHYN
THOMAS A. DALY
DAVID A. COOKE

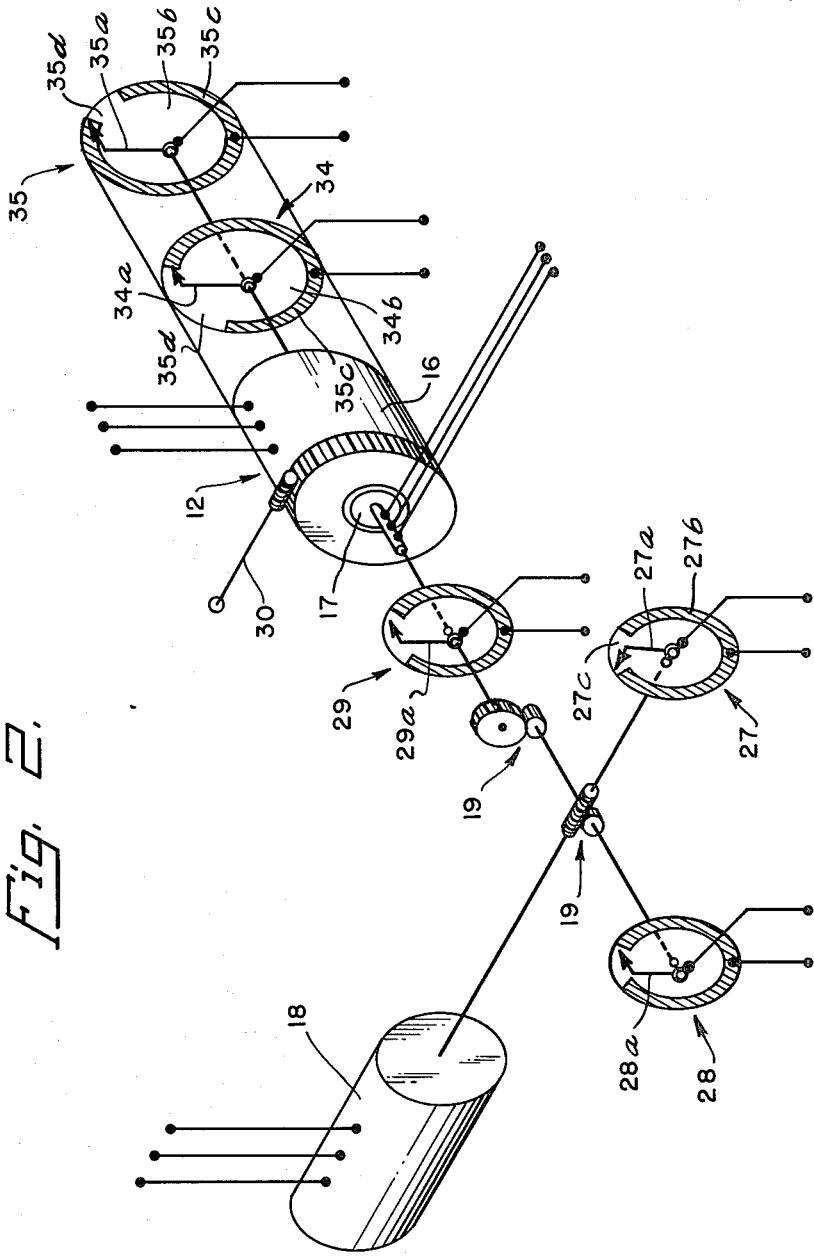

3,045,626
DEPTH STEERING SYNCHRO ASSEMBLY
Stephen Kowalyshyn, Sharon, Thomas A. Daly, Swarthmore, and David A. Cooke, Wallingford, Pa., assignors, by mesne assignments, to the United States of America as represented by the Secretary of the Navy
Filed Jan. 6, 1954, Ser. No. 402,614
10 Claims. (Cl. 114—25)

The present invention relates to torpedo depth control systems and has more particular reference to a depth steering system for acoustic torpedoes.

Heretofore various electrical, mechanical, and hydraulic arrangements have been proposed for controlling torpedoes in depth prior to and during periods of target attack. Such control systems have, however, proved to be unsuitable for present day acoustic torpedo applications owing to their complexity, the intricate adjustments necessary for satisfactory operation, and their inability to provide the accurate and sensitive depth steering required in torpedoes of the homing type.

The present invention avoids the disadvantages associated with prior art depth steering systems by providing a relatively simple, accurate, and easily adjustable depth control system, especially adaptable for use in acoustic torpedoes, wherein steering control in depth during periods of target contact is achieved by rotation of the rotor of a synchro differential generator whereby to cause the output signal of an electrical synchro assembly to vary in a manner to cause the torpedo to steer in depth. The invention further contemplates a novel cam or rotary switch arrangement for establishing floor and ceiling depth limits and for resetting the differential generator rotor to a zero position prior to launching of the torpedo whereby running depth may be set by an initial angular adjustment of the differential generator stator from the zero reset position of its rotor.

In accordance with the foregoing, it is an object of the present invention to provide an improved depth steering system for acoustic torpedoes.

Another object of the invention is to provide an improved depth steering system for acoustic torpedoes which is relatively simple in construction and operation, which requires relatively few and simple adjustments for satisfactory operation, and which provides accurate and reliable depth steering control during either a passive or active attack.

Still another object of the invention is to provide an improved depth steering system as in the foregoing which may be automatically reset or zeroized prior to firing of the torpedo.

A further object of the invention is to provide a depth steering system for acoustic torpedoes wherein a depth steering motor is selectively intermittently energized to discontinuously drive the rotor of an electrical synchro differential generator whereby to cause the torpedo to steer in increments of depth during periods of target contact in an echo ranging operation or continuously energized to provide a continuous steering operation during periods of target contact in a listening operation.

Still a further object of the invention is to provide an acoustic torpedo depth steering system as in the foregoing wherein the depth steering motor drives a series of rotary cam switches whereby the synchro differential generator rotor may be driven to an initial physical position prior to launching of the torpedo so as to enable an initial torpedo running depth to be set by angular adjustment of the differential generator stator from the zero reset position of the rotor.

And another object is to provide an improved arrangement for establishing floor and ceiling depth limits.

Other objects and many of the attendant advantages of the present invention will become apparent as the same become better understood from the following detailed description had in conjunction with the annexed drawings, wherein:

FIG. 1 schematically illustrates the electrical circuit comprising the present invention; and FIG. 2 is a diagrammatic perspective view showing the mechanical arrangement of the depth steering motor, the synchro differential generator, the drive means connecting motor and generator, and the rotary cam switches for effecting zero resetting of the generator rotor and for establishing the floor and ceiling depth limits of the torpedo.

Referring now to the drawings and more particularly to FIG. 1, there is illustrated at 10 a depth steering synchro assembly including a depth position synchro 11, a synchro differential generator 12, and a depth rate synchro 13 which assembly operates in the manner described in copending application Serial No. 405,058, filed January 19, 1954, and now U.S. Patent No. 2,938,486, issued May 31, 1960, to generate an output signal that is a function of depth displacement error and rate of change of depth. The output signal of synchro assembly 10 is fed to a servo amplifier and control surface actuator 14 for controlling the movement of the torpedo horizontal control surfaces 15. As disclosed in the above-mentioned copending application, a running depth may be set and depth steering may be achieved respectively by angular adjustment of the stator 16 and the rotor 17 of synchro differential generator 12. As will be apparent, setting of running depth by angular adjustment of the differential generator stator 16 requires that the differential generator rotor 17 be in a predetermined physical position, or zero position, before firing whereby a given physical angular position of the stator 16 will always correspond to a given setting of running depth. The present invention, then, provides an arrangement for presetting the rotor 17 of the differential generator to a given physical angular or zero position prior to firing of the torpedo and for driving the rotor 17 in the appropriate direction while the target is being tracked after launching whereby to effect depth steering of the torpedo onto the target, the present arrangement being effective to steer the torpedo either during a listening, or passive, attack, in which case depth steering is a continuous operation, or during an active, or echo ranging, attack, in which case depth steering is an intermittent operation whereby the torpedo will be steered toward the target in increments of depth.

To achieve the above described ends, there is provided at 18 a reversible D.C. depth steering and resetting motor which drives rotor 17 of the synchro differential generator 12 through a gear train 19 (FIG. 2). A switching arrangement driven by the motor, in part, and to be hereinafter described, serves, prior to firing of the torpedo, to effect energizing of motor 18 in a manner to achieve resetting of rotor 17 to its zero position and during target tracking to effect energizing of motor 18 in a manner to intermittently or continuously drive rotor 17 in a direction to steer the torpedo onto the target.

Motor 18 is made reversible by having a pair of field windings which are selectively placed in electrical circuit with one terminal of a D.C. supply 20 by the closing of one or the other of a pair of depth direction contacts 21 and 22 actuated by a latching type depth direction relay in the acoustic panel, not shown. Contact 21, the "up" contact, effects energization of the steering motor field which results in driving of rotor 17 in a direction to cause the torpedo to climb and contact 22, the "dive" contact, effects energization of the steering motor field which results in the driving of rotor 17 in a direction to cause the torpedo to dive.

The remaining terminal of motor 18 is adapted to be electrically connected to the other terminal of D.C. supply 20 through the aforementioned switching arrangement, now to be described. Prior to launching of the torpedo, current from D.C. source 20, which prior to firing actuation will be the torpedo warmup supply within the launching vessel, will flow through the series circuit including firing transfer relay contacts 23 and depth reset relay 24 whereby to effect energization of the latter and close its normally opened contacts 24a, 24b, and 24c. Transfer relay contacts 23 are, prior to launching of the torpedo, retained in their closed position, as shown, and are actuated to their open position upon energization, at the time of firing actuation, of a firing transfer relay, not shown, in the torpedo firing circuit. During the warmup period, the auxiliary gate relay contacts 25, which are actuated by an auxiliary gate relay in the acoustic panel, not shown, as will be later described, will be in their open position as illustrated, whereby the depth steering motor relay 26 will remain deenergized with its contacts 26A and 26C retained in the open position and its contact 26B in the closed position. It will be apparent, therefore, that during this warmup period, motor 18 may only be energized through the contacts designated as 27, 28, and 29, which contacts, as will appear from the following, accomplish the zero resetting of differential rotor 17 heretofore referred to.

Referring now to FIG. 2, it will be seen that reset contacts 27, 28, and 29 each comprises a rotary switch including a rotary element and a fixed element. The rotary element 27a of reset contact 27 is directly driven by motor 18, as shown. The fixed element of reset contact 27 includes an electrically conductive segment 27b and an insulating segment 27c. The rotary element 28a of reset contact 28 is driven by a shaft in the gear train 19, as shown, while the rotary element 29a of reset contact 29 is fixed to the rotor shaft of differential generator 12. Each of the fixed elements of contacts 28 and 29 includes insulating and conductive segments similar to that of contact 27. Gear train 19 is such, for example, that rotary element 27a turns 108 revolutions and rotary element 28a turns 4 revolutions to one revolution of rotary element 29a while the total length of the insulating segment associated with contact 27 may, for instance, be 50 degrees. From the above, it will be evident that when source 20 is energized during the warmup period, motor 10 will continue to operate until all of the reset contacts 27, 28, and 29 have been opened, three contacts being employed to obtain accuracy in resetting of rotor 17. Thus, if when motor 10 stops, rotary element 27a is positioned at either of the extremities of insulating segment 27c the angular displacement error of the differential rotor 17 from its zero position (i.e., the midpoint on the insulating segment associated with reset contact 29) would be 25/108 degrees or a maximum error of ±.2 degrees. Setting of a predetermined running depth may now be accomplished by a given angular adjustment of the stator 16 of differential 12 relative to the zero reset position of rotor 17. Manually operated means 30 may be provided for adjusting the angular position of the differential stator.

Upon energizing of the torpedo firing circuit, the firing transfer relay, not shown, will be energized, as previously mentioned, whereby to open firing transfer relay contacts 23 and deenergize depth reset relay 24. The depth reset relay contacts 24a, 24b, and 24c will now open thereby preventing reset contacts 28 and 29 from having any further influence on the operation of depth steering motor 18. Simultaneously, D.C. source is transferred to the torpedo D.C. supply through the operation of relays, not shown.

If, prior to launching of the torpedo, the acoustic panel is set for an active, or echo ranging attack, and steering in depth is desired, as where a submerged target is to be tracked, depth steering cam contacts 31, serially connected with depth steering motor relay 26, will be in their closed position as shown, thereby conditioning relay 26 to be energized upon closing of auxiliary gate relay contacts 25. Since the target signal during an echo ranging attack is a pulse function, the latter will, by the operation of the acoustic panel, not shown, be converted to a momentary closed pulse of the normally opened gate relay contacts 25 to effect energization of steering motor relay 26 with the resultant closing of its normally opened contacts 26a, and 26c, relay 26 thereby being sealed in by its sealing contacts 26c. The closing of the last mentioned contacts permits operating current to flow to the steering motor brake release 18a and simultaneously to motor 18, the latter being driven in the direction determined by which of the depth direction relay contacts 21 and 22 has been actuated to its closed position by the depth direction relay in the acoustic panel, not shown. Rotation of motor 18 will drive rotary switch 27 to its closed position, thereby shunting energizing current from steering relay 26 and causing deenergizing of the latter and opening of its contacts 26a and 26c. Steering motor 18 and its brake release 18a will remain energized until rotary switch 27 is again driven to its open position after one revolution of the steering motor. Owing to the 108 to 1 gear reduction between the steering motor drive shaft and the drive shaft of the differential generator rotor 17, the latter will be turned through 360/108 degrees which may correspond, for example, to a running depth charge of 5.55 feet. The above mentioned values of the gear train ratio and running depth change were cited for purposes of illustration only and while chosen for proper tactical operation in depth steering, these values may be varied as desired.

During a passive, or listening, attack, depth steering cam contact 31 will be retained in its open position whereby to prevent the energization of depth steering motor relay 26. Moreover, prior to launching of the torpedo, a homing selector switch, not shown, will be actuated to its listening position to effect energizing of an echo ranging relay, not shown, and closing of its normally opened contacts 32. Upon establishing target contact, auxiliary gate relay contacts 25 will close and remain closed as long as the target is being tracked, whereby steering motor 18 and its brake release 18a will be continuously energized during any target tracking period, the energizing current for the steering motor flowing through normally closed contacts 26b. A shunt resistor 33 provides for spark suppression. The direction of rotation of motor 18 will, as was the case during an echo ranging operation, be determined by which of the direction relay contacts 21 and 22 is in its closed position. Depth steering during a passive attack is, therefore, a continuous operation, and rotor 27 of the differential generator 12 will be continuously driven in the proper direction, as long as target contact is maintained, whereby to steer the torpedo onto the target.

Provision is made in the present invention for setting minimum and maximum depths at which the torpedo may run. To this end there is provided in each of the field winding circuits of steering motor 18 a set of contacts, 34 and 35 respectively, in series with depth direction contacts 21 and 22, respectively, as shown in FIG. 1. Thus, opening of contact 34 hereinafter referred to as the ceiling switch, will effect deenergizing of the "climb" field winding whereas opening of contact 34, hereinafter referred to as the floor switch, will effect deenergization of the "dive" field winding. Referring to FIG. 2, it will be seen that each of the ceiling and floor switches 34 and 35 comprises a rotary switch including rotary elements 34a and 35a, fixed to the shaft of differential rotor 17, and fixed elements 34b and 35b, secured to the stator of differential 12. Fixed elements 34b and 35b include electrically conductive segments 34c and 35c and insulating segments 34d and 35d. The lengths and angular positions of the insulating segments 34d and 35d are such that when differential rotor 17 is driven to a position relative to the differential stator 16 corresponding to a given minimum running depth, rotary element 34a of ceiling switch 34 will be driven onto the insulating segment 34d with a resultant opening of the associated field circuit and stopping of the steering motor 18. Similarly, the floor switch insulating segment 35d is so proportioned and positioned that the floor switch will open if the steering motor 18 drives the differential rotor to an angular position relative to its stator corresponding to a given maximum running depth.

Use of depth limit switches, such as those described above, present a distinct advantage over an arrangement utilizing pressure operated switches. The latter operate at the instantaneous depth position of the torpedo and owing to the time lag between a given torpedo depth position and the driving of the steering synchro rotor to an angular position corresponding to the given depth, the torpedo will overshoot the desired depth and run at a depth shallower than the ceiling level or deeper than the floor level. The magnitude of this error depends on the tactics of the torpedo attack. Thus the overshoot could not be compensated for in a simple manner by pressure switch setting. In present arrangement, since the running levels fixed by the ceiling and floor switches are actual running depth settings and do not depend on the torpedo position at any time, overshooting of the predetermined depth will be prevented.

Obviously, many modifications are possible in the light of the above teachings. It is therefore to be understood that within the scope of the appended claims the invention may be practiced otherwise than as specifically described herein.

What is claimed is:

1. In an acoustic torpedo depth steering system comprising an electrical synchro assembly including a synchro differential generator, for providing a depth steering signal in accordance with instantaneous angular position of the differential rotor relative to its stator, the improvements comprising a reversible steering motor, a speed reduction unit driven by the motor for driving differential rotor at a reduced rate, and means for causing intermittent energization of the steering motor for intermittent rotation thereof in a selected direction whereby to cause stepped angular movement of the differential rotor and steering of the torpedo in increments of depth.

2. The arrangement according to claim 1 wherein said means includes a rotary switch driven by said motor.

3. The arrangement according to claim 2 and means for initially energizing said motor to drive the differential rotor to a given physical position whereby a running depth be established by angular adjustment of the differential stator.

4. In an acoustic torpedo depth steering system comprising an electrical synchro assembly, including a synchro differential generator, for providing a depth steering signal in accordance with the instantaneous angular position of the differential rotor relative to its stator, the improvements comprising a reversible steering motor, a speed reduction unit driven by said motor for driving the differential rotor at a reduced rate, said motor including a pair of field windings, an operating voltage source, switch means in each of said field windings controlled by the torpedo acoustic panel for placing one terminal of a selected one of said field windings in circuit with said voltage source whereby the direction of rotation of said motor will be determined by which of said switch means is actuated to its closed position; and plurality of circuits for connecting the other terminal of said field windings to the voltage source; a first one of said circuits including switch means driven by the motor for energizing the latter in a manner to cause the differential rotor to be driven to a given physical position; a second one of said electrical circuits including means actuated by the torpedo acoustic panel on target contact for causing intermittent energization of said motor so as to provide for stepped angular movement of the differential rotor for steering of the torpedo in increments of depth; and a third one of said electrical circuits including means controlled by the torpedo acoustic panel for causing continuous energization of the steering motor during target tracking periods whereby to cause continuous rotation of the synchro rotor in the proper direction and hence continuous steering of the torpedo; and means for rendering the first of said electrical circuits inoperative upon firing actuation of the torpedo, and manually operable means for selectively conditioning one of such second and third circuits to become operable upon firing actuation.

5. The arrangement according to claim 4 wherein said first electrical circuit includes a plurality of cam switches arranged in electrical parallel and operatively connected to said speed reduction unit for rotation at different speeds, the energizing circuit of said motor being opened upon said cam switches being driven to their open position whereby to accomplish accurate zero resetting of the differential rotor.

6. The arrangement according to claim 4 wherein said second electrical circuit includes means intermittently energized by said acoustic panel, for momentarily energizing the motor, and cam switch means driven by said motor for maintaining the motor energized for one rotation thereof whereby to achieve steering of the torpedo in increments of depth.

7. The arrangement according to claim 4 wherein said third electrical circuit includes switch means controlled by the torpedo acoustic guidance system and maintained in its closed position throughout periods of target contact whereby to provide for continuous energizing of the steering motor.

8. In an acoustic torpedo depth steering system comprising an electrical synchro assembly, including a synchro differential generator, for providing a depth steering signal in accordance with the instantaneous angular position of the differential rotor relative to its stator, the improvements comprising a reversible steering motor, a speed reduction unit driven by said motor for driving the differential rotor at a reduced rate, an operating voltage source, said motor including a pair of field windings, switch means in each of said field windings controlled by the acoustic guidance system for connecting a selected one of said field windings to said source whereby the direction of rotation said steering motor will be determined by which of said switch means is actuated to its closed position, an electrical circuit including switch means controlled by the acoustic guidance system for connecting the other terminal of said field windings to the voltage source, and a cam switch driven by said motor in one of said field circuits for opening the latter upon the differential rotor being driven to an angular position relative to its stator corresponding to a given depth.

9. The arrangement according to claim 8 wherein the last-mentioned switch means is in the field circuit the energization of which results in rotation of the steering motor in a direction to cause the torpedo to dive, and wherein said switch means is driven to an open position upon the differential rotor being driven to a position corresponding to a preset maximum depth.

10. The arrangement according to claim 9 and similar switch means in the other field circuit of said steering motor, the last mentioned switch being driven to its open position upon driving of the differential rotor to a position corresponding to a preset minimum depth.

References Cited in the file of this patent

UNITED STATES PATENTS

| 2,337,589 | Chance | Dec. 28, 1945 |
| 2,619,733 | Horton | Dec. 2, 1952 |
| 2,657,350 | Rossire | Oct. 27, 1953 |

OTHER REFERENCES

Servomechanism Fundamentals, McGraw-Hill (Lauer, Lesnick and Matson), p. 38.